United States Patent

Koizumi

[11] 4,029,398
[45] June 14, 1977

[54] OBJECTIVE FOR VIDEO DISKS

[75] Inventor: Toshimichi Koizumi, Sagamihara, Japan

[73] Assignee: Olympus Optical Co., Ltd., Tokyo, Japan

[22] Filed: July 18, 1975

[21] Appl. No.: 597,224

[30] Foreign Application Priority Data

July 22, 1974 Japan .................... 49-83888

[52] U.S. Cl. .................... 350/231; 350/175 ML
[51] Int. Cl.$^2$ .................... G02B 9/06
[58] Field of Search .......... 350/230, 231, 175 ML, 350/175 E

[56] References Cited

UNITED STATES PATENTS

| 873,870 | 12/1907 | König | 350/231 |
| 2,781,694 | 2/1957 | Takahashi | 350/175 ML |

FOREIGN PATENTS OR APPLICATIONS 898,084  11/1973  Germany .................... 350/231

*Primary Examiner*—John K. Corbin
*Assistant Examiner*—Conrad Clark
*Attorney, Agent, or Firm*—Cushman, Darby & Cushman

[57] ABSTRACT

An objective for video disks of two-component three-lens configuration satisfying the following conditions and having high resolving power and large numerical aperture.

(1)  1.25  $f_1/f$  0.85
(2)  2  $r_2/d_1$  1
(3)  $n_2 - n_3$  0.2
(4)  1.1  $r_4/f$  0.82
(5)  1  $d_2/f$  0.4

6 Claims, 21 Drawing Figures

SPHERICAL
ABERRATION

OSC'

DISTORTION

ASTIGMATISM

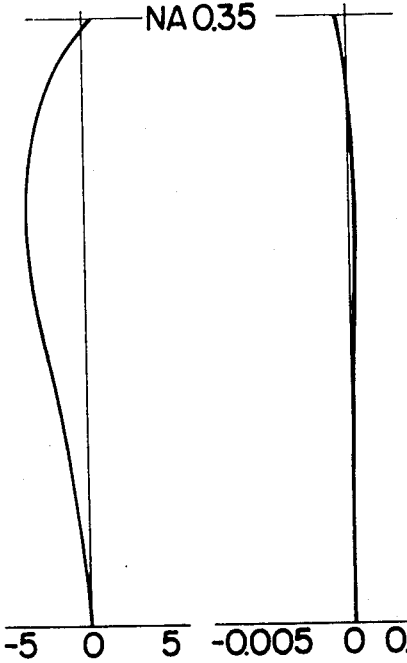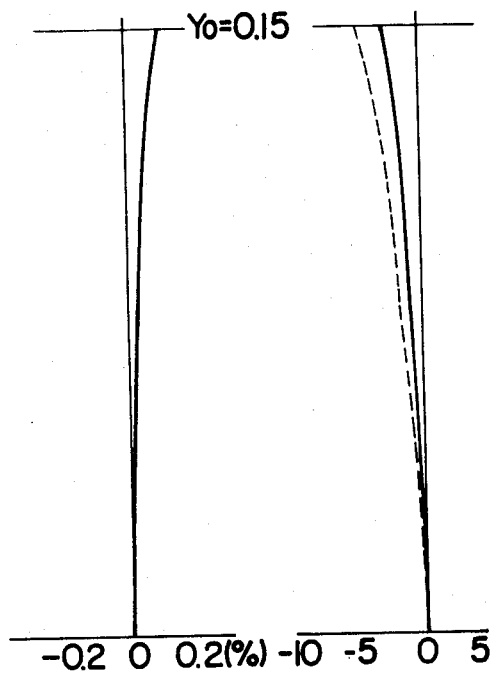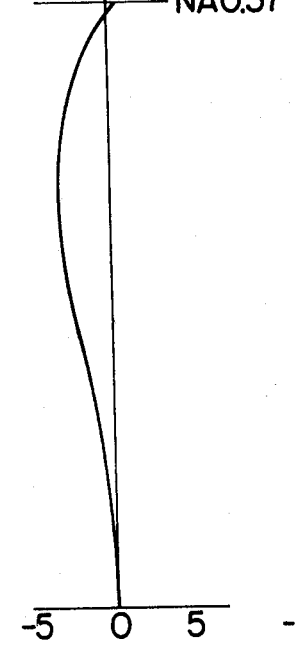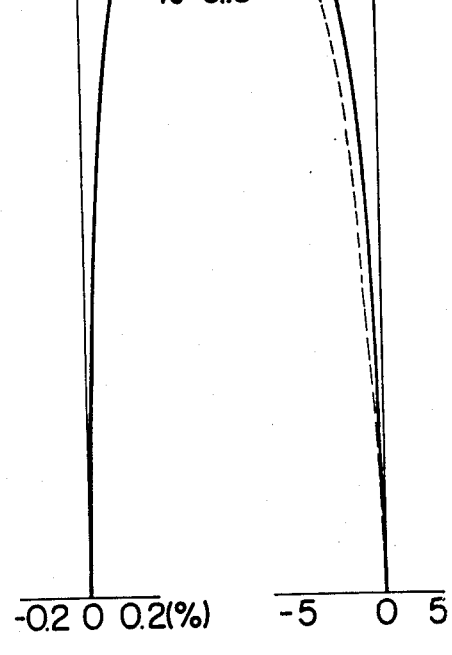

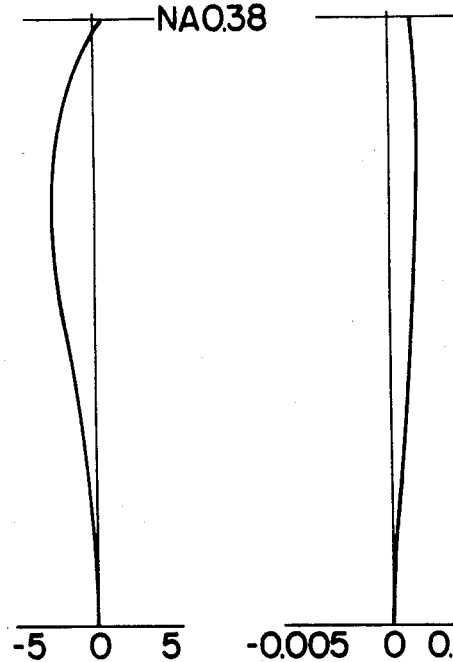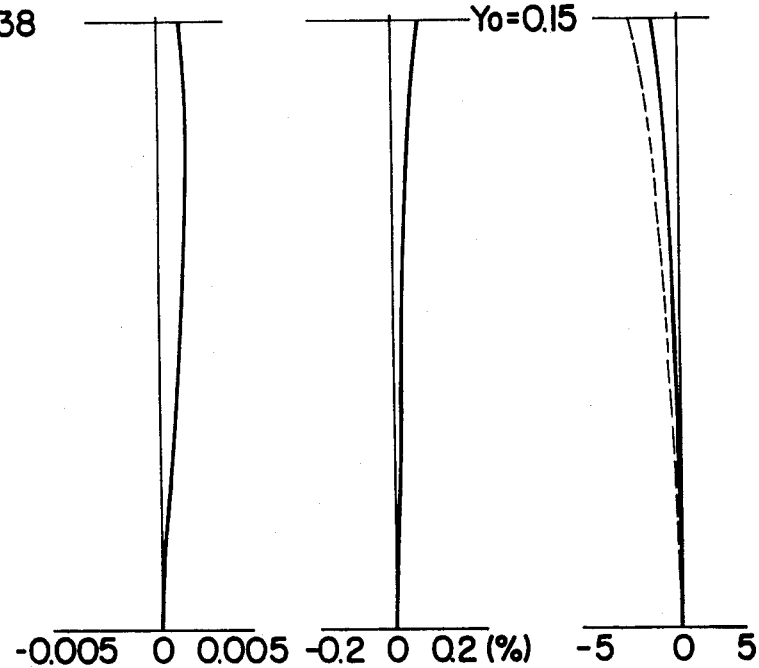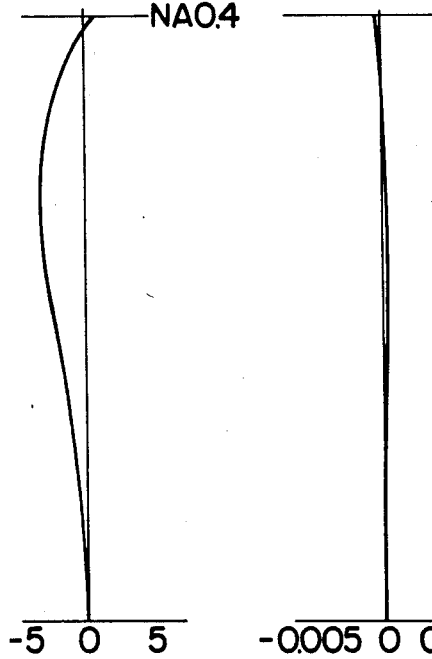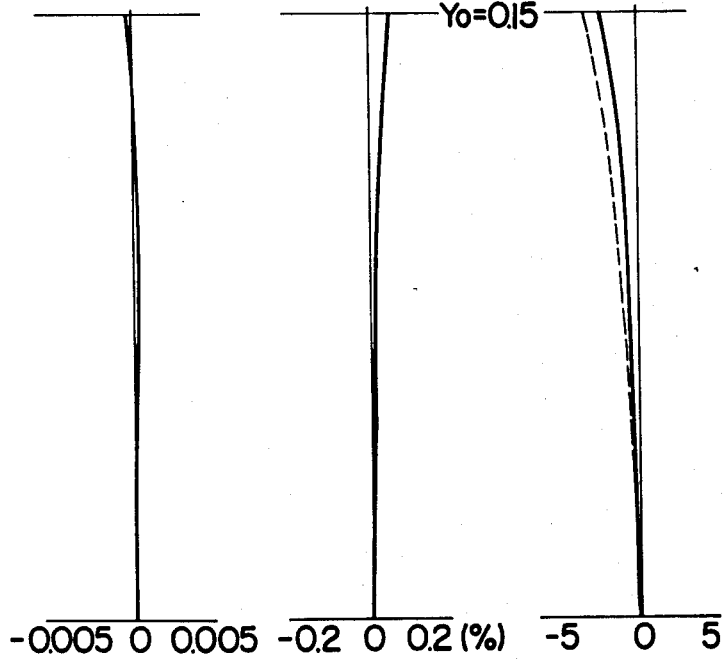

OBJECTIVE FOR VIDEO DISKS

BACKGROUND OF THE INVENTION

1. Field of the invention

The present invention relates to an objective for video disks and, more particularly, to an objective for reading out the signals recorded on high-density information-recording disks (video disks).

2. Background of the invention

For objectives to be used in reproducing systems for video disks, it is required to warrant resolving power of $1\mu$ and the numerical aperture of N.A. 0.35 or over due to the fact that the objective has to read out very small signals recorded with high density. Unlike microscope objectives in general, in case of objectives for video disks, observation by an eyepiece is not carried out but the image formed by the objective is detected by a light-receiving element. Therefore, the quality of the image focused by the objective has serious influence on performance of the reproducing system. Moreover, the objective for video disks has to be compact, light in weight, and low in price and has to be arranged for automatic focusing.

Besides, the light used for the objective for video disks is generally a monochromatic light (for example, $\lambda = 632.8$ nm). When transparency for the light of the wavelength to be used is as far as possible high, it is effective for eliminating the noise at the time of amplifying the signals from a detector. Therefore, in order to make transparancy of the light high, it is necessary to provide multi-layer anti-reflection coating on lens surfaces or to make the number of lenses constituting the objective as small as possible. When this problem is considered in connection with the above-mentioned other requirements such as low price and light weight, it is more advantageous when the number of lenses constituting the objective is made as small as possible.

SUMMARY OF THE INVENTION

It is, therefore, a primary object of the present invention to provide an objective for video disks comprising a small number of lenses and, moreover, having high resolving power and large numerical aperture.

As shown in FIG. 1, the objective for video disks according to the present invention is a lens system of two-component three-lens configuration comprising a front lens component, which is an approximately hemispherical lens (a lens having a thickness equal to or smaller than the radius of curvature of its convex surface) with its plane surface positioned toward the object, and a rear lens component which is a cemented doublet lens consisting of a negative lens and a positive lens. Besides, the objective for video disks according to the present invention satisfies the following conditions when reference symbol $f$ represents the focal length of the lens system as a whole, reference $f_1$ represents the focal length of the front lens component, reference symbol $r_2$ represents the radius of curvature of the surface on the image side of the front lens component, reference symbol $r_4$ represents the radius of curvature of the cemented surface of the rear lens component, reference symbol $d_1$ represents the thickness of the front lens component, reference symbol $d_2$ represents the airspace between the front and rear lens components, and reference symbols $n_2$ and $n_3$ respectively represent refractive indices of respective lens elements of the rear lens component.

(1) $1.25 \geq f_1/f \geq 0.85$
(2) $2 \geq |r_2|/d_1 \geq 1$
(3) $n_2 - n_3 \geq 0.2$
(4) $1.1 \geq r_4/f \geq 0.82$
(5) $1 \geq d_2/f \geq 0.4$ When, in the lens system of the above-mentioned configuration, the refractive index $n_1$ of the single lens constituting the front lens component is varied from a low refractive index to high refractive index by keeping the refractive power of the lens system at a certain value, the radius of curvature of the single lens constituting the front lens component, i.e., the radius of curvature $|r_2|$ of the surface on the image side of said lens generally becomes large and, consequently, undercorrection of spherical aberration of the front lens component is reduced accordingly. In case, therefore, that it is possible to correct spherical aberration caused by the front lens component by means of the rear lens component, it is possible to make the numerical aperture N.A. larger when the refractive index of the front lens component is made larger. Moreover, as the work distance also becomes larger in that case, it is more advantageous for actual use.

However, the above-mentioned correcting method has a certain limit in case of a lens system comprising a small number of lenses like the objective according to the present invention, and the ranges for which aberrations caused the front lens component can be corrected by the rear lens component are as explained below.

At first, for the single lens constituting the front lens component, it is necessary to select the ratio between the lens thickness $d_1$ of the front lens component and radius of curvature $r_2$ of the convex surface of said lens, i.e., of the surface on the image side of said lens, and to select refractive power of said lens within the ranges defined by the afore-mentioned conditions (1) and (2) in order to solve problems in the manufacture of the lens, especially to solve the problem of the cost of production, and in order to keep spherical aberration corrected favourably. In other words, if the relation of $r_2$ and $d_1$ in the condition (1) becomes $|r_2|/d_1 < 1$, the shape of the single lens constituting the front lens component becomes larger than hemisphere (i.e., the thickness of said lens becomes larger than the radius of curvature of its convex surface). As a result, the focal length $f_1$ becomes small, i.e., $f_1/f < 0.85$, even when any material having any refractive index is used. Moreover, as the manufacture of the lens becomes more difficult, the cost of production becomes extremely higher. If said relation becomes $|r_2|/d_1 > 2$, it becomes $f_1/f > 1.25$. In this case, it is not difficult to manufacture the lens. However, spherical aberration at the zonal portion will be undercorrected. If it is attempted to correct said spherical aberration, it becomes necessary to make the radius of curvature $r_4$ of the cemented surface of the cemented doublet lens constituting the rear lens component small. Consequently, said spherical aberration cannot be corrected satisfactorily even when the difference of refractive indices of respective lenses of the rear lens component large so that it becomes $n_2 - n_3 \geq 0.2$.

To arrange the lens system so that spherical aberration can be corrected easily as described in the above and that the radius of curvature $r_4$ of the cemented surface of the cemented doublet lens constituting the rear lens component is selected as a value for which it is not difficult to manufacture the lens, it is necessary to select the relation between the thickness $d_1$ and radius of curvature $r_2$ of the single lens constituting the front lens component as $2 \geq r_2/d_1 \geq 1$ and to select refractive power of the front lens component within the range of $1.25 \geq f_1/f \geq 0.85$.

Besides, if the difference $n_2 - n_3$ of refractive indices of respective lenses constituting the rear lens component is smaller than 0.2, spherical aberration caused by the front lens component cannot be corrected satisfactorily unless the radius of curvature $r_4$ of the cemented doublet lens is made extremely small. If, however, $r_4$ is made extremely small, the manufacture of the lens becomes difficult and the cost of production will increase. If the radius of curvature $r_4$ of the cemented surface of the rear lens component is $r_4/f > 1.1$, it becomes impossible to satisfactorily correct spherical aberration caused in the front lens component and, consequently, undercorrection will be caused for the lens system as a whole. If, on the contrary, the radius of curvature $r_4$ becomes $r_4/f < 0.82$, spherical aberration at the marginal portion will be overcorrected. When, therefore, $r_4/f$ becomes larger or smaller than the upper or lower limit of the range defined by the condition (4), it becomes impossible to correct spherical aberration favourably.

The airspace $d_2$ between the front and rear lens components is related to the sine condition and correction of astigmatism. If $d_2$ becomes $d_2/f > 1$, the sine condition will be undercorrected. If $d_2$ becomes $d_2/f < 0.4$, the astigmatic difference will become large. The condition (5), i.e., $1 \geq d_2/f \geq 0.4$ is established for the purpose of balancing these aberrations.

Moreover, for video disks, monochromatic light ($\lambda = 632.8$ nm) is generally used for reproduction. When, however, using the objective according to the present invention by the light of two or more colours, it is also possible to favourably correct chromatic aberration provided that Abbe's numbers of the single lens constituting the front lens component and respective lenses of the cemented doublet lens constituting the rear lens component are respectively selected as $\nu_1 \geq 50$, $\nu_2 \leq 40$ and $\nu_3 \geq 50$.

BRIEF DESCRIPTION OF THE DRAWINGS

FIGS. 3A, 3B, 3C and 3D respectively show graphs illustrating aberration curves of the Embodiment 2 of the present invention;

FIGS. 4A, 4B, 4C and 4D respectively show graphs illustrating aberration curves of the Embodiment 3;

FIGS. 5A, 5B, 5C and 5D respectively show graphs illustrating aberration curves of the Embodiment 4 of the present invention; and FIGS. 6A, 6B, 6C and 6D respectively show graphs illustrating aberration curves of the Embodiment 5 of the present invention.

DETAILED DESCRIPTION OF THE PREFERRED EMBODIMENTS

Figure 1:
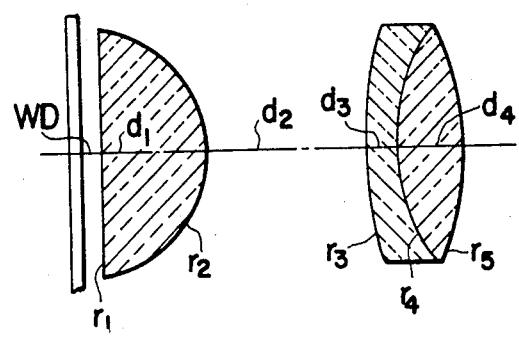
FIG. 1 shows a sectional view of the objective according to the present invention.
Figure 2A:
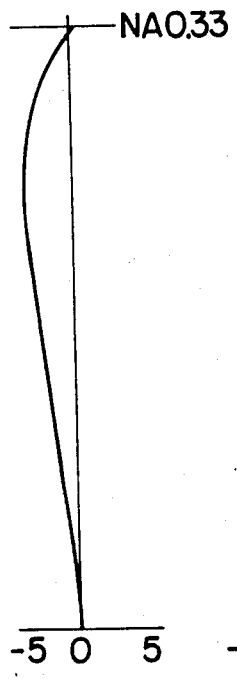
FIGS. 2A, 2B, 2C and 2D respectively show graphs illustrating aberration curves of the Embodiment 1 of the present invention.
Figure 2B:
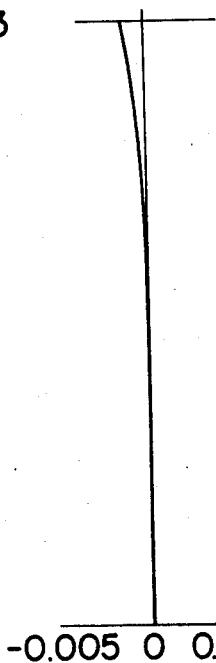
Figure 2C:
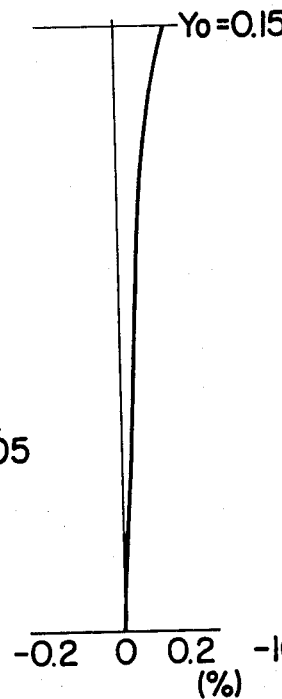
Figure 2D:
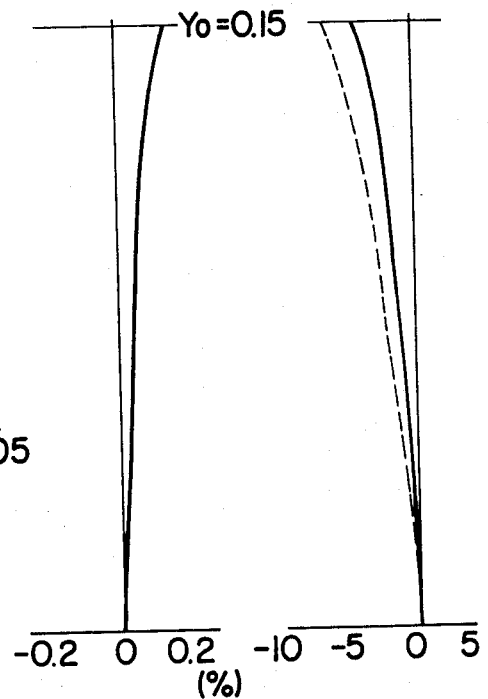

Preferred embodiment of the objective for video disks according to the present invention having configuration as explained in the above and satisfying the respective conditions given in the above are as shown below.

```
Embodiment 1
r_1 = ∞
  d_1 = 0.372         n_1 = 1.51462         ν_1 = 64.1
r_2 = -0.524
  d_2 = 0.832
r_3 = 1.642
  d_3 = 0.151         n_2 = 1.77861         ν_2 = 25.7
r_4 = 0.859
  d_4 = 0.305         n_3 = 1.48601         ν_3 = 70.1
r_5 = -1.555
  f = 1 ,             β = -35x ,            N.A. = 0.33
  WD = 0.103 ,        ΣP = 0.1902 ,         f_1 = 1.02
Embodiment 2
r_1 = ∞
  d_1 = 0.372         n_1 = 1.56671         ν_1 = 56.2
r_2 = -0.549
  d_2 = 0.906
r_3 = 1.632
  d_3 = 0.145         n_2 = 1.77861         ν_2 = 25.7
r_4 = 0.865
  d_4 = 0.301         n_3 = 1.48601         ν_3 = 70.1
r_5 = -1.632
  f = 1 ,             β = -35x ,            N.A. = 0.35
  WD = 0.096 ,        ΣP = 0.188 ,          f_1 = 0.97
Embodiment 3
r_1 = ∞
  d_1 = 0.562         n_1 = 1.61655         ν_1 = 36.3
r_2 = -0.693
  d_2 = 0.655
r_3 = 1.944
  d_3 = 0.142         n_2 = 1.77861         ν_2 = 25.7
r_4 = 0.95
  d_4 = 0.304         n_3 = 1.49668         ν_3 = 65.0
r_5 = -1.62
  f = 1 ,             β = -35x ,            N.A. = 0.37
  WD = 0.102 ,        ΣP = 0.165 ,          f_1 = 1.12
Embodiment 4
r_1 = ∞
  d_1 = 0.731         n_1 = 1.72309         ν_1 = 28.5
r_2 = -0.831
  d_2 = 0.577
r_3 = 2.007
  d_3 = 0.135         n_2 = 1.77861         ν_2 = 25.7
r_4 = 0.986
  d_4 = 0.308         n_3 = 1.49668         ν_3 = 65.0
r_5 = -1.969
  f = 1 ,             β = -35x ,            N.A. = 0.38
  WD = 0.098 ,        ΣP = 0.151 ,          f_1 = 1.15
Embodiment 5
r_1 = ∞
  d_1 = 0.758         n_1 = 1.77861         ν_1 = 25.7
r_2 = -0.878
  d_2 = 0.606
r_3 = 2.07
  d_3 = 0.149         n_2 = 1.77861         ν_2 = 25.7
r_4 = 1.004
  d_4 = 0.305         n_3 = 1.49668         ν_3 = 65.0
r_5 = -2.029
  f = 1 ,             β = -35x ,            N.A. = 0.4
  WD = 0.099 ,        ΣP = 0.146 ,          f_1 = 1.13
```

In the above-mentioned respective embodiments, reference symbols $r_1$ through $r_5$ respectively represent radii of curvature of respective surfaces of respective lenses, reference symbols $d_1$ through $d_4$ respectively represent thicknesses of respective lenses and airspace between respective lens components, reference symbols $n_1$, $n_2$ and $n_3$ respectively represent refractive indices of respective lenses for the wavelength of 632.8 nm, reference symbols $\nu_1$, $\nu_2$ and $\nu_3$ respectively represent Abbe's numbers of respective lenses for $d$ line, reference symbol $f$ represents the focal length of the lens system as a whole, reference symbol $\beta$ represents magnification, reference symbol N.A. represents numerical aperture, reference symbol WD represents work distance, reference symbol $\Sigma P$ represents Petzval's sum, and reference symbol $f_1$ represents the focal length of the front lens component.

As explained in the above and illustrated by respective embodiments, the present invention provides an objective for video disks comprising a small number of lenses which is small in size and light in weight.

I claim:

1. An objective for video disks comprising a front lens component and a rear lens component, said front lens component being an approximately hemispherical lens with its plane surface positioned toward the object side, said rear lens component being a cemented doublet lens consisting of a concave lens and a convex lens, said objective for video disks satisfying the following conditions:

(1) $1.15 > f_1/f > 0.97$
(2) $1.5 > r_2/d_1 > 1.1$
(3) $n_2 - n_3 > 0.28$
(4) $1.01 > r_4/f > 0.85$
(5) $0.91 > d_2/f > 0.57$ wherein reference symbol $f$ represents the focal length of the lens system as a whole, reference symbol $f_1$ represents the focal length of the front lens component, reference symbol $r_2$ represents the radius of curvature of the surface on the image side of the front lens component, reference symbol $r_4$ represents the radius of curvature of the cemented surface of the rear lens component, reference symbol $d_1$ represents the thickness of the front lens component, reference symbol $d_2$ represents the airspace between the front lens component and rear lens component, and reference symbols $n_2$ and $n_3$ respectively represent refractive indices of respective lenses constituting the rear lens component.

2. An objective for video disks comprising a front lens component and a rear lens component, said front lens component being an approximately hemispherical lens with its plane surface positioned toward the object side, said rear lens component being a cemented doublet lens consisting of a concave lens and a convex lens, said objective for video disks having the following numerical data:

| | | |
|---|---|---|
| $r_1 = \infty$ | | |
| $d_1 = 0.372$ | $n_1 = 1.51462$ | $\nu_1 = 64.1$ |
| $r_2 = -0.524$ | | |
| $d_2 = 0.832$ | | |
| $r_3 = 1.642$ | | |
| $d_3 = 0.151$ | $2 = 1.77861$ | $\nu_2 = 25.7$ |
| $r_4 = 0.859$ | | |
| $d_4 = 0.305$ | $n_3 = 1.48601$ | $\nu_3 = 70.1$ |
| $r_5 = -1.555$ | | |
| $f = 1$, | $\beta = -35x$, | N.A. $= 0.33$ |
| WD $= 0.103$, | $\Sigma P = 0.1902$, | $f_1 = 1.02$ | wherein reference symbols $r_1$ through $r_5$ respectively represent radii of curvature of respective surfaces of respective lenses, reference symbols $d_1$ through $d_4$ respectively represent thicknesses of respective lenses and airspace between respective lens components, reference symbols $n_1$, $n_2$ and $n_3$ respectively represent refractive indices of respective lenses for the wavelength of 632.8 nm, reference symbols $\nu_1$, $\nu_2$ and $\nu_3$ respectively represent Abbe's numbers of respective lenses for $d$ line, reference symbol $f$ represents the focal length of the lens system as a whole, reference symbol $\beta$ represents magnification, reference symbol N.A. represents numerical aperture, reference symbol WD represents work distance, reference symbol $\Sigma P$ represents Petzval's sum, and reference symbol $f_1$ represents the focal length of the front lens component.

3. An objective for video disks comprising a front lens component and a rear lens component, said front lens component being an approximately hemispherical lens with its plane surface positioned toward the object side, said rear lens component being a cemented doublet lens consisting of a concave lens and a convex lens, said objective for video disks having the following numerical data:

| | | |
|---|---|---|
| $r_1 = \infty$ | | |
| $d_1 = 0.372$ | $n_1 = 1.56671$ | $\nu_1 = 56.2$ |
| $r_2 = -0.549$ | | |
| $d_2 = 0.906$ | | |
| $r_3 = 1.632$ | | |
| $d_3 = 0.145$ | $n_2 = 1.77861$ | $\nu_2 = 25.7$ |
| $r_4 = 0.865$ | | |
| $d_4 = 0.301$ | $n_3 = 1.48601$ | $\nu_3 = 70.1$ |
| $r_5 = -1.632$ | | |
| $f = 1$, | $\beta = -35x$, | N.A. $= 0.35$ |
| WD $= 0.096$, | $\Sigma P = 0.188$, | $f_1 = 0.97$ | wherein reference symbols $r_1$ through $r_5$ respectively represent radii of curvature of respective surfaces of respective lenses, reference symbols $d_1$ through $d_4$ respectively represent thicknesses of respective lenses and airspace between respective lens component, reference symbols $n_1$, $n_2$ and $n_3$ respectively represent refractive indices of respective lenses for the wavelength of 632.8 nm, reference symbols $\nu_1$, $\nu_2$ and $\nu_3$ respectively represent Abbe's numbers of respective lenses for $d$ line, reference symbol $f$ represents the focal length of the lens system as a whole, reference symbol $\beta$ represents magnification, reference symbol N.A. represents numerical aperture, reference symbol WD represents work distance, reference symbol $\Sigma P$ represents Petzval's sum, and reference symbol $f_1$ represents the focal length of the front lens component.

4. An objective for video disks comprising a front lens component and a rear lens component, said front lens component being an approximately hemispherical lens with its plane surface positioned toward the object side, said rear lens component being a cemented doublet lens consisting of a concave lens and a convex lens, said objective for video disks having the following numerical data:

| | | |
|---|---|---|
| $r_1 = \infty$ | | |
| $d_1 = 0.562$ | $n_1 = 1.61655$ | $\nu_1 = 36.3$ |
| $r_2 = -0.693$ | | |
| $d_2 = 0.655$ | | |
| $r_3 = 1.944$ | | |
| $d_3 = 0.142$ | $n_2 = 1.77861$ | $\nu_2 = 25.7$ |
| $r_4 = 0.95$ | | |
| $d_4 = 0.304$ | $n_3 = 1.49668$ | $\nu_3 = 65.0$ |
| $r_5 = -1.62$ | | |
| $f = 1$, | $\beta = -35x$, | N.A. $= 0.37$ |
| WD $= 0.102$, | $\Sigma P = 0.165$, | $f_1 = 1.12$ | wherein reference symbols $r_1$ through $r_5$ respectively represent radii of curvature of respective surfaces of respective lenses, reference symbols $d_1$ through $d_4$ respectively represent thicknesses of respective lenses and airspace between respective lens components, reference symbols $n_1$, $n_2$ and $n_3$ respectively represent refractive indices of respective lenses for the wavelength of 632.8 nm, reference symbols $\nu_1$, $\nu_2$ and $\nu_3$ respectively represent Abbe's numbers of respective lenses for $d$ line, reference symbol $f$ represents the focal length of the lens system as a whole, reference symbol $\beta$ represents magnification, reference symbol N.A. represents numerical aperture, reference symbols WD represents work distance, reference symbol $\Sigma P$ represents Petzval's sum, and reference symbol $f_1$ represents the focal length of the front lens component.

5. An objective for video disks comprising a front lens component and a rear lens component, said front lens component being an approximately hemispherical lens with its plane surface positioned toward the object side, said rear lens component being a cemented doublet lens consisting of a concave lens and a convex lens, said objective for video disks having the following numerical data:

| | | |
|---|---|---|
| $r_1 = \infty$ | | |
| $d_1 = 0.731$ | $n_1 = 1.72309$ | $\nu_1 = 28.5$ |
| $r_2 = -0.831$ | | |
| $d_2 = 0.577$ | | |
| $r_3 = 2.007$ | | |
| $d_3 = 0.135$ | $n_2 = 1.77861$ | $\nu_2 = 25.7$ |
| $r_4 = 0.986$ | | |
| $d_4 = 0.308$ | $n_3 = 1.49668$ | $\nu_3 = 65.0$ |
| $r_5 = -1.969$ | | |
| $f = 1$, | $\beta = -35x$, | N.A. $= 0.38$ |
| WD $= 0.098$, | $\Sigma P = 0.151$, | $f_1 = 1.15$ | wherein reference symbols $r_1$ through $r_5$ respectively represent radii of curvature of respective surfaces of respective lenses, reference symbols $d_1$ through $d_4$ respectively represent thicknesses of respective lenses and airspace between respective lens components, reference symbols $n_1$, $n_2$ and $n_3$ respectively represent refractive indices of respective lenses for the wavelength of 632.8 nm, reference symbols $\nu_1$, $\nu_2$ and $\nu_3$ respectively represent Abbe's numbers of respective lenses for $d$ line, reference symbol $f$ represents the focal length of the lens system as a whole, reference symbol $\beta$ represents magnification, reference symbol N.A. represents numerical aperture, reference symbol WD represents work distance, reference symbol $\Sigma P$ represents Petzval's sum, and reference symbol $f_1$ represents the focal length of the front lens component.

6. An objective for video disks comprising a front lens component and a rear lens component, said front lens component being an approximately hemispherical lens with its plane surface positioned toward the object side, said rear lens component being a cemented doublet lens consisting of a concave lens and a convex lens, said objective for video disks having the following numerical data:

| | | |
|---|---|---|
| $r_1 = \infty$ | | |
| $d_1 = 0.758$ | $n_1 = 1.77861$ | $\nu_1 = 25.7$ |
| $r_2 = -0.878$ | | |
| $d_2 = 0.606$ | | |
| $r_3 = 2.07$ | | |
| $d_3 = 1.149$ | $n_2 = 1.77861$ | $\nu_2 = 25.7$ |
| $r_4 = 1.004$ | | |
| $d_4 = 0.305$ | $n_3 = 1.49668$ | $\nu_3 = 65.0$ |
| $r_5 = -2.029$ | | |
| $f = 1$, | $\beta = -35x$, | N.A. $= 0.4$ |
| WD $= 0.099$, | $\Sigma P = 0.146$, | $f_1 = 1.13$ | wherein reference symbols $r_1$ through $r_5$ respectively represent radii of curvature of respective surfaces of respective lenses, reference symbols $d_1$ through $d_4$ respectively represent thicknesses of respective lenses and airspace between respective lens components, reference symbols $n_1$, $n_2$ and $n_3$ respectively represent refractive indices of respective lenses for the wavelength of 632.8 nm, reference symbols $\nu_1$, $\nu_2$ and $\nu_3$ respectively represent Abbe's numbers of respective lenses for $d$ line, reference symbol $f$ represents the focal length of the lens system as a whole, reference symbol $\beta$ represents magnification, reference symbol N.A. represents numerical aperture, reference symbol WD represents work distance, reference symbol $\Sigma P$ represents Petzval's sum, and reference symbol $f_1$ represents the focal length of the front lens component.

* * * * *